United States Patent [19]
Gotoh et al.

[11] Patent Number: 4,672,297
[45] Date of Patent: Jun. 9, 1987

[54] AC GENERATOR CONTROL STATUS DETECTING DEVICE WITH SHORT-CIRCUIT PROTECTION MEANS

[75] Inventors: Hiroshi Gotoh, Tokyo; Kenshiro Hashimoto, Saitama, both of Japan

[73] Assignee: Honda Giken Kogyo Kabushiki Kaisha, Tokyo, Japan

[21] Appl. No.: 731,850

[22] Filed: May 7, 1985

[30] Foreign Application Priority Data

May 9, 1984 [JP] Japan .............................. 59-68308[U]

[51] Int. Cl.⁴ ............................................. H02J 7/14
[52] U.S. Cl. ...................................... 322/28; 322/99; 361/20
[58] Field of Search ...................... 322/28, 99; 320/60, 320/61, 64; 361/20, 21

[56] References Cited

U.S. PATENT DOCUMENTS

| 4,354,182 | 10/1982 | Frey | 322/99 X |
| 4,401,937 | 8/1983 | Morishita | 322/28 |
| 4,470,003 | 9/1984 | Mitchell | 322/28 X |

*Primary Examiner*—R. J. Hickey
*Attorney, Agent, or Firm*—Lyon & Lyon

[57] ABSTRACT

An AC generator control status detecting device having an AC generator with a plurality of stator coils, a field coil and a plurality of rectifying diodes connected to the stator coils; a regulator connected to the field coil to control field current; a field current state output terminal connected to the junction of the field coil and the regulator; and a current limiting element between the junction and the field current state output terminal. Normal operation of the generator is maintained even when the field current state output terminal is short-circuited to ground.

6 Claims, 2 Drawing Figures

AC GENERATOR CONTROL STATUS DETECTING DEVICE WITH SHORT-CIRCUIT PROTECTION MEANS

BACKGROUND OF THE INVENTION

The present invention relates to an AC generator control device and more particularly to an AC generator control device of the type in which an electric current flowing through a field coil is controlled by turning a regulator on and off.

In conventional AC generators, electric current flows through a field coil and is controlled by turning a regulator on and off. The duty ratio of a pulse signal developed at the junction of the field coil and the regulator and taken out through a field current state output terminal (F terminal) is used for a predetermined control. An example of the operation of such a generator in an automotive context is described below.

When a headlight is lit during idling of the engine, the field current increases to increase the power output of the AC generator in accordance with the increase of the load current. That is, the duty ratio of the pulse signal becomes larger. As the generated output increases, the load imposed on the engine also increases. If no countermeasure is taken, it is possible that the idling speed will diminish, or that stalling of the engine will occur.

To avoid such occurrences, the duty ratio of the pulse signal developed at the junction of the field coil and the regulator is detected by a voltage detection circuit connected to the F terminal and the throttle valve opening is controlled according to this detected value to keep the idling speed constant.

In such a generator, since a line is extended from the F terminal to the voltage detection circuit, a short-circuit can occur between the line and ground. It is apparent that if such a short-circuit were to occur, there would be an uncontrollable flow of current in the field coil and the voltage output of the AC generator from the output terminal (B terminal) would increase to an abnormal extent. A battery charged by such abnormal output voltage might be damaged as a result, as would an electrical device operated by such output voltage.

When the engine is turned off under such abnormal conditions, the field current will continue to flow from the battery through the B terminal of the generator, the field coil, the F terminal and the short-circuited portion. As a result, the battery capacity would be reduced, or the battery would become overly discharged.

SUMMARY OF THE INVENTION

It is a primary object of the present invention to provide an AC generator control device which, even when the F terminal is short-circuited to ground, permits the AC generator to operate in an almost normal condition to prevent the battery from being charged or discharged to excess and prevent an excess voltage from being applied to electrical devices.

In order to achieve the above object, the present invention provides an AC generator control status detecting device having an AC generator with a plurality of stator coils, a field coil and a plurality of rectifying diodes connected to the stator coils; a regulator connected to the field coil to control field current; a field current state output terminal connected to the junction of the field coil and the regulator; and a current limiting element between the junction and the field current state output terminal (F terminal).

Preferably, the current limiting element is a diode. A resistor of appropriate value can also be used as the current limiting element.

DETAILED DESCRIPTION

The present invention is described below in greater detail with reference to the accompanying drawings which schematically illustrate a device in accordance with a preferred embodiment thereof.

Figure 1:
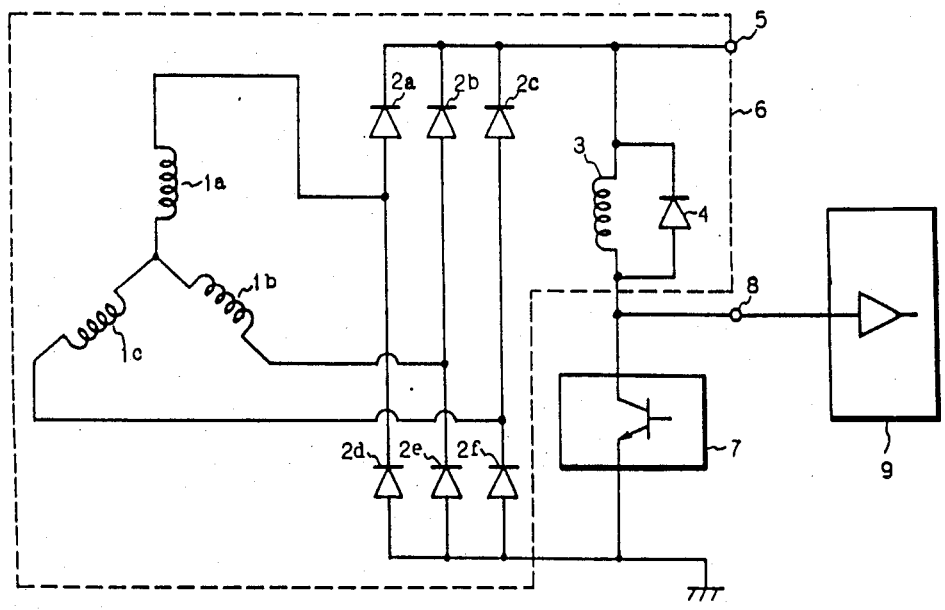
FIG. 1 is a schematic diagram showing an example of a conventional AC generator and its peripheral circuit.

Referring first to FIG. 1, there is schematically illustrated a conventional AC generator 6 having stator coils 1a, 1b, 1c; rectifying diodes 2a, 2b, 2c, 2d, 2e, and 2f connected to the stator coils; a field coil 3 (rotor coil); a diode 4 connected in parallel with the field coil 3; and a terminal 5 (B terminal 5) for outputting the electric power induced in the stator coils 1a–1c. Connected to the AC generator 6 are a regulator 7 which turns on and off to control field current; a field current state output terminal 8 (F terminal 8) extending from the junction of the field coil 3 and regulator 7; and a voltage detection circuit 9 for detecting a duty ratio of a pulse signal appearing at the F terminal 8.

Figure 2:
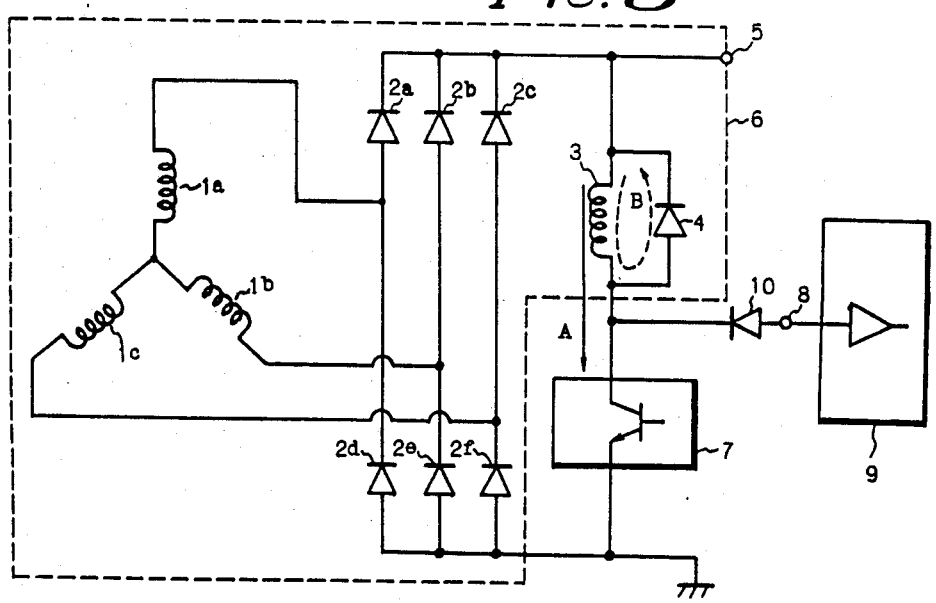
FIG. 2 is a schematic diagram showing an embodiment of the present invention.

Referring now to FIG. 2, there is shown a block diagram of an AC generator and its peripheral circuit according to an embodiment of the present invention. The same reference numerals are used in FIG. 2 as are used in FIG. 1 to represent the same or equivalent elements.

The present invention differs from the prior art device shown in FIG. 1 in that a diode 10 is disposed between the field coil 3 - regulator 7 junction and the F terminal 8.

According to the embodiment of the present invention shown in FIG. 2, when the regulator 7 is turned on, the field current flows in the direction of arrow A. Electric current (signal current) from the F terminal 8 side is simultaneously fed to the regulator 7 through the diode 10. As a result, the voltage detection circuit 9 detects a low level period of the pulse signal appearing at the field coil 3 - regulator 7 junction.

When the regulator 7 is turned off, the field current circulates through the field coil 3 and the diode 4 as shown in broken-line arrow B and is gradually extinguished. Signal current does not flow at this time, and thus the voltage detection circuit 9 detects a high level period of the pulse signal.

In this embodiment of the present invention, as previously noted, even in the event that the F terminal 8 is short-circuited to ground, the field current could not flow to ground through the F terminal 8 because the diode 10 is disposed in a direction opposite to the flow of field current.

Unlike the prior art device, therefore, in this embodiment of the present invention there will be no uncontrollable current in the field coil 3 even upon the occurrence of a short-circuit between the F terminal 8 and ground. That is, the AC generator 6 can be operated almost normally under these circumstances.

Although in the above-described embodiment of the present invention the diode 10 is used as the current limiting element which protects against short-circuiting, the present invention is not limited thereto. Similar results can be obtained by using an appropriate resistor in place of the diode 10.

Where a resistor is used, there will be a small amount of current flowing through the F terminal 8 to the ground. If the appropriate resistor is used, for example, about 100 Ohms to 100,000 Ohms preferably about 10,000 Ohms, where the rated voltage is 12 Volts, to keep such current at a sufficiently small value relative to the field current, usually about 3 to 4 Amps, then the field current will be within the controllable range of the regulator 7. It thus becomes possible to operate the AC generator normally.

While the invention as described hereinabove represents the preferred embodiments of the present invention, it will be understood that the invention is not limited to those particular embodiments. On the contrary, it is intended to cover all variations, alternatives, modifications, and equivalents thereof, as may be included within the spirit and scope of the invention as defined by the appended claims.

What is claimed is:

1. An AC generator control status detecting device comprising:
    and AC generator having a plurality of stator coils, a field coil and a plurality of rectifying diodes connected to said stator coils;
    a regulator connected to said field coil to control field current;
    a field current state output terminal connected to the junction of said field coil and said regulator; and
    a field current limiting element between said junction and said field current state output terminal for protecting against excessive voltage output to either power storage units or electrical devices connected to said AC generator in case of a short-circuit to ground from a line, including said field current state output terminal, extending from said field current state output terminal away from said junction.

2. The AC generator control status detecting device as claimed in claim 1, wherein said current limiting element is a diode connected in a direction opposite to the field current.

3. The AC generator control status detecting device as claimed in claim 1, wherein said current limiting element is a resistor.

4. An AC generator control status detecting device for an AC generator having a plurality of stator coils and a field coil with a regulator connected to the field coil to control field current and a field current output terminal connected to the junction of the field coil and regulator, the improvement comprising,
    a field current limiting element between the junction and said field current state output terminal for protecting against excessive voltage output to either power storage units or electrical devices connected to said AC generator in case of a short-circuit to ground from a line, including said field current state output terminal, extending from said field current state output terminal away from said junction.

5. The AC generator control status detecting device as claimed in claim 4, wherein said current limiting element is a diode connected in a direction opposite to the field current.

6. The AC generator control status detecting device as claimed in claim 4, wherein said current limiting element is a resistor.

* * * * *